(12) United States Patent
Dansie et al.

(10) Patent No.: US 7,308,487 B1
(45) Date of Patent: Dec. 11, 2007

(54) SYSTEM AND METHOD FOR PROVIDING FAULT-TOLERANT REMOTE CONTROLLED COMPUTING DEVICES

(75) Inventors: Christopher Dansie, Holladay, UT (US); Chad Martin Dressler, Midvale, UT (US); Jordan Seth Larsen, Bountiful, UT (US); Patrick Kelly Struhs, Salt Lake City, UT (US)

(73) Assignee: iGate Corp., Salt Lake City, UT (US)

( * ) Notice: Subject to any disclaimer, the term of this patent is extended or adjusted under 35 U.S.C. 154(b) by 306 days.

(21) Appl. No.: 10/015,322

(22) Filed: Dec. 12, 2001

Related U.S. Application Data

(60) Provisional application No. 60/255,212, filed on Dec. 12, 2000.

(51) Int. Cl.
  *G06F 15/16* (2006.01)
  *G06Q 40/00* (2006.01)
(52) U.S. Cl. ............... 709/219; 709/203; 709/231; 705/39; 705/40; 705/42
(58) Field of Classification Search ............ 714/4, 714/23, 25, 31, 48; 709/202, 203, 212, 216, 709/219, 227, 231, 220–222, 217, 224
  See application file for complete search history.

(56) References Cited

U.S. PATENT DOCUMENTS

| | | | | |
|---|---|---|---|---|
| 5,726,909 A | * | 3/1998 | Krikorian ............... | 700/94 |
| 5,761,071 A |   | 6/1998 | Bernstein et al. ...... | 364/479.07 |
| 5,953,005 A | * | 9/1999 | Liu ........................ | 715/500.1 |
| 5,959,945 A | * | 9/1999 | Kleiman ................. | 381/81 |
| 6,006,332 A | * | 12/1999 | Rabne et al. ............. | 726/6 |
| 6,009,274 A | * | 12/1999 | Fletcher et al. ........ | 717/173 |
| 6,038,545 A | * | 3/2000 | Mandeberg et al. ...... | 705/15 |
| 6,078,848 A |   | 6/2000 | Bernstein et al. ........ | 700/237 |

(Continued)

OTHER PUBLICATIONS

Surfnet Premiere; 1999 Info Technologies Corp.; http://www.infotouch.net/frame/softwareupd.hmtl.; pp. 1-32.

(Continued)

*Primary Examiner*—Ario Etienne
*Assistant Examiner*—Sargon N Nano
(74) *Attorney, Agent, or Firm*—Madson & Austin

(57) ABSTRACT

A system and method for providing a fault-tolerant remote controlled computing device. A multi-tasking operating system and at least one primary process are executed on the computing device. A first monitor process determines whether any primary process is in a fault state. In response to any primary process being in a fault state, the first monitor process resolves the fault state of each such primary process. In certain embodiments, a local copy of a common configuration file and multimedia content are stored on the computing device. The computing device polls a server at pre-determined time intervals via a public Internet connection for updates to one or more processes, the local copy of the common configuration file, and the multimedia content. In response to updates being available from the server, the computing device downloads one or more updates via a fault-tolerant network connection and plays the multimedia content based on instructions contained within the local copy of the central configuration file. In one configuration, a user-defined notification system is provided which allows users to define threshold values. Once the threshold values are satisfied, one or more users may be notified.

10 Claims, 5 Drawing Sheets

U.S. PATENT DOCUMENTS

| | | | | |
|---|---|---|---|---|
| 6,141,684 | A * | 10/2000 | McDonald et al. | 709/222 |
| 6,167,358 | A * | 12/2000 | Othmer et al. | 702/188 |
| 6,167,567 | A * | 12/2000 | Chiles et al. | 717/173 |
| 6,173,316 | B1 | 1/2001 | De Boor et al. | 709/218 |
| 6,202,207 | B1 * | 3/2001 | Donohue | 717/173 |
| 6,268,856 | B1 | 7/2001 | Bruck et al. | 345/357 |
| 6,275,694 | B1 * | 8/2001 | Yoshida et al. | 455/419 |
| 6,289,384 | B1 | 9/2001 | Whipple et al. | 709/229 |
| 6,292,186 | B1 | 9/2001 | Lehman et al. | 345/335 |
| 6,314,565 | B1 * | 11/2001 | Kenner et al. | 717/171 |
| 6,324,586 | B1 | 11/2001 | Johnson | 709/248 |
| 6,347,398 | B1 * | 2/2002 | Parthasarathy et al. | 717/178 |
| 6,362,836 | B1 * | 3/2002 | Shaw et al. | 715/744 |
| 6,493,871 | B1 * | 12/2002 | McGuire et al. | 717/173 |
| 6,557,054 | B2 * | 4/2003 | Reisman | 710/33 |
| 6,581,157 | B1 * | 6/2003 | Chiles et al. | 713/1 |
| 6,587,835 | B1 * | 7/2003 | Treyz et al. | 705/14 |
| 6,718,549 | B1 * | 4/2004 | Narin et al. | 717/178 |
| 6,725,260 | B1 * | 4/2004 | Philyaw | 709/220 |
| 6,728,760 | B1 * | 4/2004 | Fairchild et al. | 709/217 |
| 6,735,632 | B1 * | 5/2004 | Kiraly et al. | 709/229 |
| 6,751,598 | B1 * | 6/2004 | Yagawa et al. | 705/51 |
| 6,757,710 | B2 * | 6/2004 | Reed | 709/203 |
| 6,842,906 | B1 * | 1/2005 | Bowman-Amuah | 719/330 |
| 6,933,433 | B1 * | 8/2005 | Porteus et al. | 84/615 |
| 6,980,963 | B1 * | 12/2005 | Hanzek | 705/26 |
| 7,177,841 | B2 * | 2/2007 | Inoue et al. | 705/51 |
| 2002/0004781 | A1 * | 1/2002 | Forsyth | 705/39 |

OTHER PUBLICATIONS

David Strom; Control Everything; NetworkWorldFusion Reviews; http://www.nwfusion.com/reviews/2001/0820rev.html; pp. 1-10.

Net Ware Connection; http://www.nwconnection.com/resources/remote-contro.shtml; pp. 1-2, Dec. 5, 2001.

Omnivex—Powerful Display Software; Ominivex Corporation; http://www.omnivex.com/selectcategory.asp; pp. 1-5, Mar. 26, 2001.

Fred Digital Signage Processors (DSP) The Millennium Series Features and Pricing; www.DigitalSignageNetworks.com; pp. 1-11, Jan. 1, 2001.

Touch Vision Interactive Systems; http://www.touchvision.com; pp. 1-22, Nov. 30, 2000.

Netshift Software; http://www.netshift.com; pp. 1-9, Nov. 30, 2000.

Kudos 4Personal Health; http://www.degasoft.com/products/runtime.asp; pp. 1-10, May 17, 2001.

Network Management; Touch Vision Network Operations Center; http://www.touchvision.com/NetworkOps.html; pp. 1-5, May 17, 2001.

NetKey Manager; http://www.netkey.com/products/manager; pp. 1-7, Feb. 9, 2001.

Netkey Total Kiosk Solutions; Netkey Inc.; http://www.netkey.com; pp. 1-6, Nov. 30, 2000.

* cited by examiner

SYSTEM AND METHOD FOR PROVIDING FAULT-TOLERANT REMOTE CONTROLLED COMPUTING DEVICES

RELATED APPLICATIONS

This application claims priority from U.S. Patent Application Ser. No. 60/255,212, filed Dec. 12, 2000, for "Blueware web-enabled media and content delivery and tracking systems," with inventors Chad Dressler, Jordan S. Larsen, Christopher Dansie, P. Kelly Struhs, Christopher Woods, which is hereby incorporated by reference.

BACKGROUND

1. Field of the Invention

The present invention relates generally to the field of client-server computing devices. More specifically, the present invention relates to a system and method for providing fault-tolerant remote controlled computing devices.

2. Description of Related Background Art

Conventionally, remote computing devices are prone to faults, errors which may occur in the software which executes on the devices. When these devices fail, or enter a fault state, the users are left with a very undesirable interface with the computing device. Where a computing device may have been designed and functioned to provide multi-media presentation and allow user interaction, when the device enters a fault state, or error condition, the device become inoperable. In certain circumstances, the device may be an eye sore rather than an attractive billboard, kiosk, or marketing device.

The present invention is a client-server application working across the web or a private (Transmission Control Protocol/Internet Protocol) TCP/IP network. This client application uses a complied propriety client code base which utilizes a web browser as a display mechanism on the client side and a web server on the server end. The purpose of the invention is to monitor and manage a computer device and its visual and auditory content on a TCP/IP network securely from a server on a public or private network. The invention allows monitoring and management of the client device by an interchange of data and configuration files on a periodic basis. Device system health and usage can be pushed to the server and data and content can pulled from the server for use on the client device. The system is composed of a variety of components that all use common (Hyper-Text Transfer Protocol) HTTP and (Secure Hyper-Text Transfer Protocol) HTTPS protocols as the transport mechanism. The carrier network can be encrypted with SSL for privacy and security reasons. The file format for data exchange is (eXtensible Markup Language) XML making it highly portable and re-usable by customers for off-line analysis if needed. Binary data is transported in its native format.

Representative features may include;

The system may provide 100% centralized management and configuration of an unlimited number of devices from a typical web browser The system can work reliably across a variety of TCP/IP connections of questionable stability The system can manage delivery and display of large content files across slow networks without interrupting the playing of the media The system provides inherent remote monitoring (uptime monitoring) and remote control (application restarts and rebooting of systems) of the software installed at the device.

The system provides near real-time statistical reporting on the playing of multimedia files and interaction with the interactive portions of the application.

The system provides centralized remote control of URL's that can be accessed to provide content filtering for the interactive on a per client basis The system provides real-time error logging to a central server for troubleshooting The system provides high-availability of the application software at the client via sophisticated self-healing mechanisms The system inherently scales well cause of the batch-mode nature of client and server interaction The system is built on standard protocols (HTTP, SSL, XML). Thus, the system is extensible and adaptable to new technologies and data types Accordingly, what is needed is a system and method that overcomes the problems and disadvantages of the prior art. In particular, the system and method should provide mechanisms to ensure the remote computing device provides nearly one-hundred percent reliability. Alternatively, if the software enters a fault state the remote computing device should provide a graceful default response such that the device does not create negative impressions in the minds of users and passers by. The system and method should provide reliable operation even when connections to a server system use un-reliable, un-secure, and low bandwidth connections over the public Internet. Additionally, the system and method should allow a user to define custom event for which the user is notified if the event is satisfied. Generally, these event may include errors encountered by the remote computing device.

BRIEF DESCRIPTION OF THE DRAWINGS

Non-limiting and non-exhaustive embodiments of the invention are described with reference to the figures, in which.

DETAILED DESCRIPTION OF THE PREFERRED EMBODIMENTS

The present invention will be described hereafter in reference to the accompanying drawings, in which preferred embodiments of the invention are shown. The invention, however, may be embodied in many different forms and should not be construed as limited to the embodiments set forth herein; rather, these embodiments are provided so that this disclosure will be thorough and complete and will fully convey the scope of the invention to those skilled in the art.

System Architecture

Figure 1:
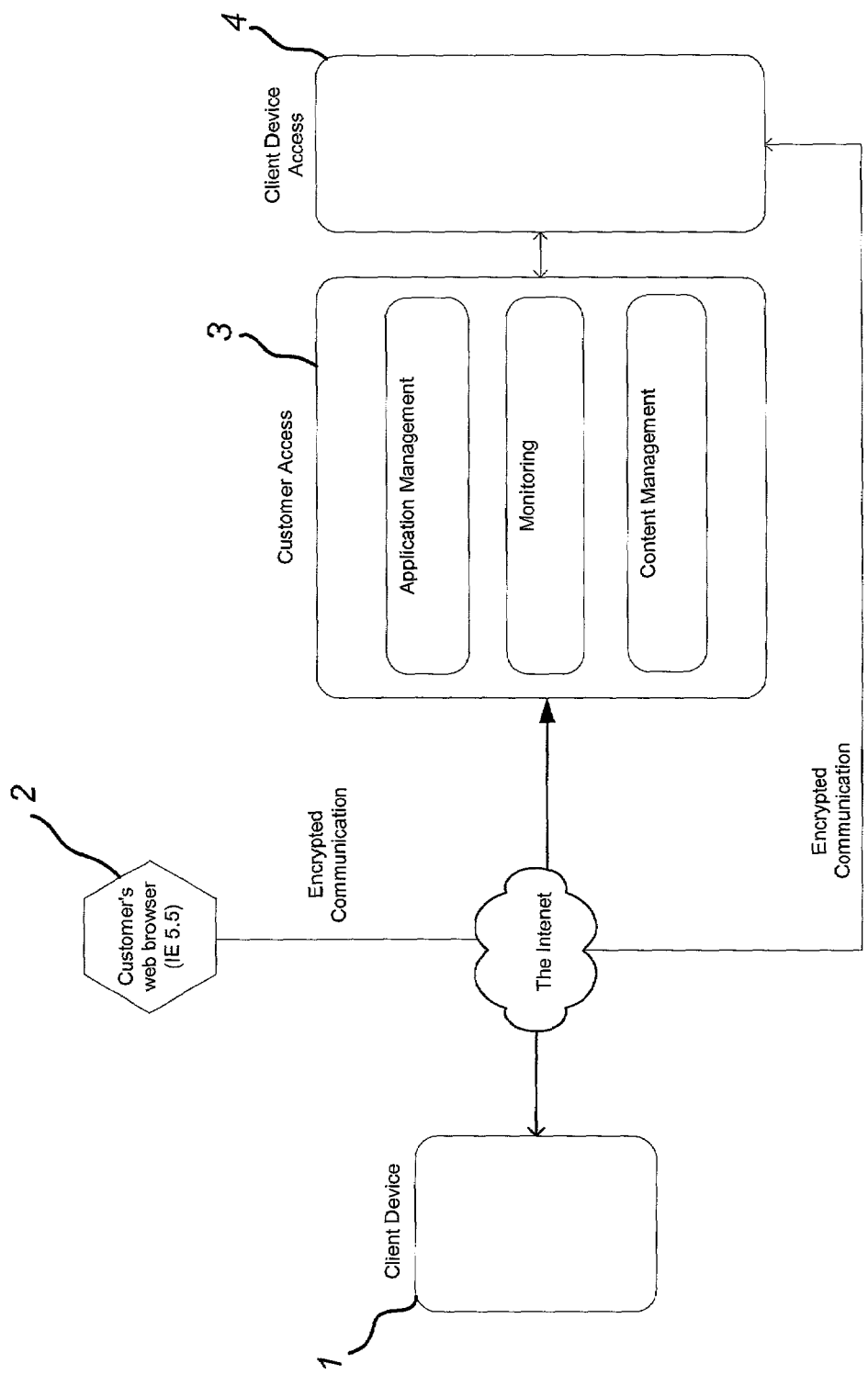
FIG. 1 is a block diagram of top-level system interaction and architecture.

In one embodiment, the system (see FIG. 1) may include a client system and a server system that utilizes HTTP and HTTPs for regular, periodic communication. The strategy for securing these communications is using existing SSL technologies to encrypt all communication between the client and server.

In certain embodiment, components are specifically designed to work across un-reliable networks of various bandwidth sizes. While the interactivity of the client applications is dependent upon an actual connection, all other components can function successfully across slow or periodically failing links. The configuration and logging features are small byte size data transfers and the large binary files can be trickled down to the client, as the local queue will not attempt to play the file until it has been successfully downloaded. Thus the high-availability responsibility is shifted to the client, which minimizes the need for 100% uptime on the servers. This allows the servers to be taken down for maintenance and upgrades without content play interruption, without data loss in the various log files or other client side interaction. This added layer of redundancy makes for a robust end-to-end system that achieves maximum uptime.

Due to the small byte size of configuration and logging data and the pseudo real-time asynchronous communication mechanism of the components, the load on the servers is inherently minimized. The servers will scale well, handling a significant number of client applications per server. The actual load will depend upon the polling frequency.

Client Components

Figure 2:
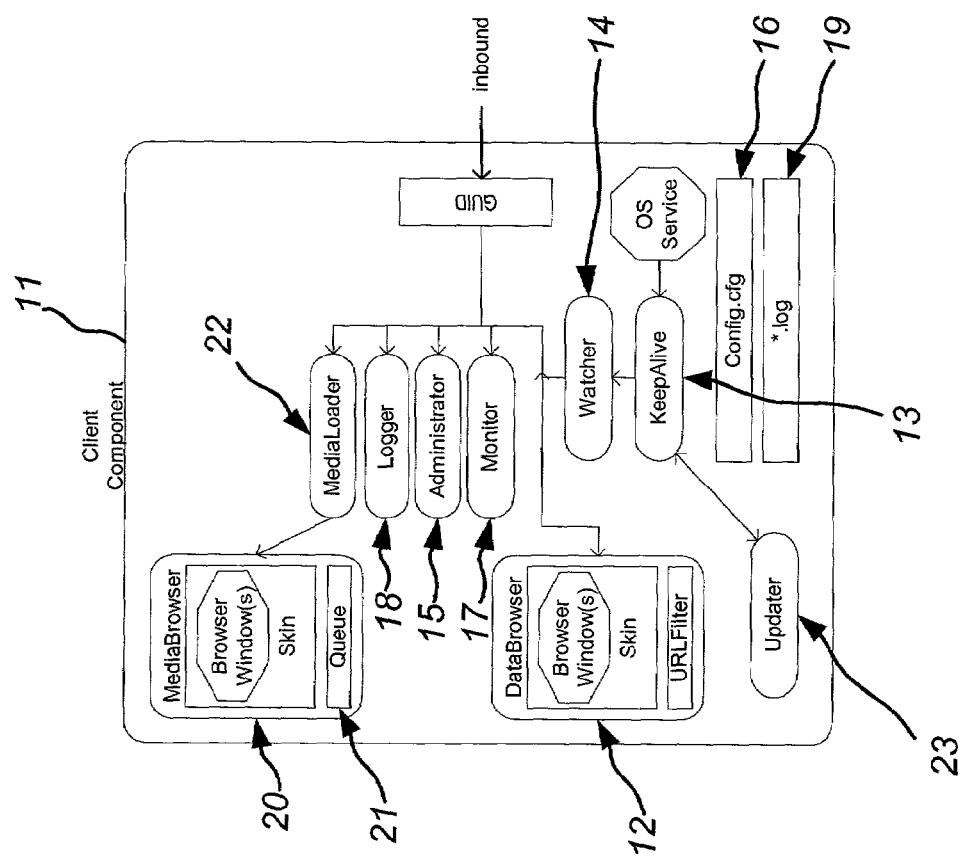
FIG. 2 is a block diagram of client components of the present invention.

The client component 11 (see FIG. 2) is a multi-process application that consists of a layered system of processes that configures, monitors, logs and updates the application and that reports on system stability and availability. It installs as an operating system service for maximum reliability in an un-manned environment. It can be installed on a private network utilizing non-routable IP addresses for device security and without opening any in-bound ports on the firewall. All configuration and logging is communicated with the server via XML. The local XML files are encrypted for privacy and security. Referring to FIG. 2:

DataBrowser: This is the interactive web interface 12 that allows a customer to provide public web access or controlled access to e-commerce or informational sites to their clients. It is a customized web browser with a software keyboard for touchscreen interaction. It functions in several modes that control the number of windows, the presence of buttons, etc. The look-and-feel of the interface can be pushed out from the server using a technology called "skins". The control of volume, refresh times, attractor loops, etc. are all controlled from the central server. All interaction with the DataBrowser is in the form of clicking of hyperlinks and these clicks are logged locally in XML format for batch upload to the database. This allows near real-time statistics on usage per device. The logging is again persistent in the event of server downtime or localized network drops.

KeepAlive: This component 13 watches Watcher to ensure it is alive. Due to the complexity of Watcher it is more susceptible to failure. KeepAlive is very simple, creating a robust application. It can be run as a service allowing the operating system to monitor and restart the component as needed.

Watcher: This component 14 continually monitors the client components to detect process failures and/or hangs. It intelligently stops and re-starts the client components as needed to ensure high availability. The inherent nature of delivering web content to the display opens the components up to significant problems and client crashes because the client is running code from un-trusted and un-proven sources. Issues such as improperly coded HTML pages and unstable plug-ins for media display can on occasionally cause failures in the application that can render it un-usable. The Watcher process quickly overcomes these random errors by re-starting the client applications as needed.

Administrator: This component 15 retrieves the configuration file 16 for the client system. The configuration file is common to all other client systems. In the event, that the network is down the administrator queues delivery until a connection is re-established. This component also has the ability to download an arbitrary executable file or script and execute it. These files can be uploaded to the server and scheduled to be run on specific devices at specific times. Administrator then receives a notification from the server when a file is to be executed, at which time it downloads the file and executes it. This capability can be used for system administration tasks, to remotely install or maintain third-party software, and during client updates is used to download the latest version of Updater.

Monitor: This component 17 regularly grabs device shots and system information for upload by Logger to the server.

Logger: This component 18 handles uploading of the local log 19 files to the server for both MediaBrowser and DataBrowser. In the event of the network being down the application queues delivery of log files until a connection is re-established, to provide substantially 100% success in logging to the server.

MediaBrowser: This is the component 20 that reads the local MediaFile queue 21 from the local system, loads the necessary binary MediaFile and displays the file to the viewer. The web browser is utilized in a full device mode without menus and borders to hide the web browser and simply show the content. The currently available file formats are QuickTime, Flash, Shockwave, JPEG, Text, and MPEG, though any format supported as a plug-in by the web browser is an optional format. The actual display of each MediaFile is logged for batch upload to the database. This gives actual play history to provide perfect statistics for billing even in the face of unexpected network downtime.

MediaLoader: This is the component 22 that retrieves the upcoming MediaFile play queue, downloads the needed binary files from the server and then turns control of the queue over to MediaBrowser to display the content. MediaLoader retrieves the upcoming play queue from the server at intervals specified by the configuration retrieved by Administrator. If new content is detected it is retrieved. If previously used content files are on the system, they are deleted by this component. This component allows for seamless download of large MediaFiles with less reliance on stable network connectivity.

Updater 23: This component handles updating the components retrieved from the server as software versions are pushed out to the devices. Updater manages the KeepAlive component during updating of critical files and ensures return to normal operation after updating is completed. Updater can be scheduled to run after hours to minimize user interruption. This component is downloaded and executed by Administrator when a new software version becomes available. Updater then handles downloading and installing all of the new software components. This allows Updater to be customized as needed for each new version.

In one embodiment computing devices are remotely controlled and fault tolerant. One embodiment includes a multitasking operating system executing on the computing device. Executing within the multitasking operating system is at least one primary process and a first monitor process.

A multitasking operating system is one which allows one or more other processes to be executed in near real time on the computing device. Examples of multitasking operating systems include UNIX, Microsoft Windows, and others.

The primary processes are responsible for providing multi-media content and interaction with customers and others using the computing device. The first monitor process is tasked with monitoring each of the primary processes. The first monitor process monitors each of the primary processes to determine if one of the primary processes has entered a fault state.

A fault state refers to the condition of a primary process or any computer process that's executing on a computer which enters an error condition or a fault condition. The fault condition may be that the process is using all the central processing units (CPU) cycles. Alternatively, a fault state may be that the program has encountered an error. Either a user error or an execution error and is hung up for some reason. These kinds of conditions are referred to as fault states within this application.

In certain embodiments, the monitor process continues to determine whether these primary processes have entered a fault state. If at least one primary process enters a fault state, then the first monitor process resolves the fault state of the at least one primary process resolving the fault state.

In certain embodiments resolving the fault state of one or more primary processes may be accomplished in various ways. For example, in one embodiment, the first monitor process identifies at least one primary process which is in a fault state and restarts execution of the identified at least one primary process. This means that the monitor process is able to determine which primary process is in the fault state and then takes steps to stop execution of the primary process in the fault state and restart the primary process once it has been successfully stopped.

In another embodiment, resolving the fault state may include identifying the primary process which is in a fault state and determining whether the identified primary process can be restarted. In other words, the fault state may be a condition which does not allow the primary process to be restarted.

For example, the monitor process may attempt to restart the primary process x number of times 5 times, 10 times, etc. With each restart of the primary process, the monitor process may determine that the primary process is not able to continue execution beyond that point. Therefore, the monitor process may determine that this primary process is not restartable. In that case, the monitor process may terminate one or more of the primary processes and resort to starting the execution of one or more stable default processes. This is done because the primary processes may be web pages, they may be JavaScripts, or other executable programs which have faults or other problems with them, such that execution cannot continue. So instead of allowing the computing device to remain in such an unstable and unreliable state, certain more trusted or stable default processes are executed. These may be a simple blank screen, they may be a continuously played video clip. Other ideas for stable default processes are readily apparent to those skilled in the art.

In certain embodiments, a second monitor process may be executed within the multitasking operating system and the second monitor process may be a very simple process, tasked only with determining whether the first monitor processes in a fault state. As mentioned earlier, the first monitor process is responsible for monitoring one or more primary processes and therefore the first monitor process may be somewhat complicated. However, the second monitor process may be very simple because it's only task is to determine whether the first monitor process is executing and doing what it is supposed to.

So in response to the first monitor process being in a fault state, as determined by the second monitor process, the second monitor process resolves the fault state of the first monitor process. As mentioned above, the second monitor process may do this by restarting the first monitor process and/or resorting to a default more stable first monitor process.

In addition, in certain embodiments, the second monitor process may typically be executed within the operating system and the operating system may be tasked with monitoring the status of the second monitoring process. For example, the second monitoring process may be executed as a service within Microsoft Windows 2000. In this instance, the service may be configured to be automatically restarted if it ever stops execution. Thus, the operating system is tasked with essentially doing similar monitoring steps on the second monitor process.

In certain embodiments, the determination by the first monitor process whether the at least one primary process is in a fault state may be accomplished using various techniques. For example, in one embodiment the first monitor process polls the operating system to determine whether the at least one primary process is still executing and then in response to a message from the operating system, the first monitor process may determine whether the at least one primary process is executing and thereby determine whether or not the at least one primary process is in a fault state.

In another embodiment, the at least one primary processes may be configured to periodically record logging information to a common log file. For example, each primary process may record a time and date stamp when it accomplished a certain task or performed certain operation with respect to the computing device. The logging information may include a time and date stamp, a recording of a URL which was selected by the user, and the like. Those skilled in the art recognize that logging information may include various kinds of information with respect to the executing primary processes.

Preferably, the primary processes share a common log file for storing logging information. Therefore, in one embodiment the first monitor process may determine whether at least one primary process is in a fault state by accessing the common log file for the logging information associated with each of the primary processes. Next, the first monitor process may determine based on the logging information whether the at least primary processes in a fault state.

For example, after examining the logging information the first monitor process may determine that a particular primary process has not made a log entry for an extended period of time. i.e. 5 minutes. In that case, such a condition may indicate that the first primary process is in a fault state. The primary process is not able to continue execution which would cause periodic logging as expected. Therefore, since the logging information is not as expected, the primary process is likely in a fault state. Thus, the first monitor process then takes steps to resolve the fault state.

Therefore, in certain embodiments in the present invention, a system and method is providing a fault tolerant remote control computing device. A computing device is able to continue execution of the primary processes because there are one or more additional processes which have the task of monitoring the one or more primary processes to ensure that the one or more primary processes continue to execute.

In certain embodiments, the remote control computing devices may be used as a display screen or a kiosk computer. The computing device may be remotely located and may interface with multiple users at various times. High reliability for the computing device is required such that the users are not given a negative impression of the vendor or retailer who has installed the computing devices.

These clients work together to create a highly available client application for un-attended use on a common Operating System (OS) with a wide variety of third-party code that is interacting with a high probability of failure.

Figure 3:
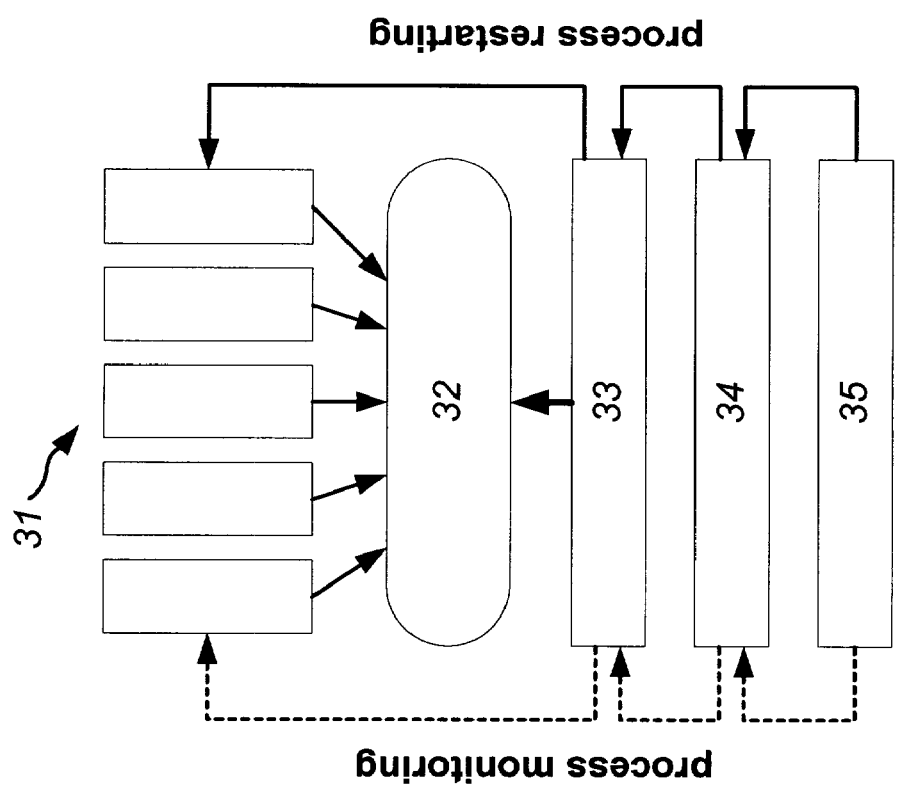
FIG. 3 is a block diagram a self-repair mechanism for client components of the present invention.

In a preferred embodiment, a layered process intra-monitoring mechanism achieves high application availability on the client application. This is desirable as the client device is typically un-manned and yet high uptime is necessary. To accomplish this (see FIG. 3), the system is comprised of a client application where the multiple top-most processes 31 regularly write to a shared log file 32 where any number of processes can use this file.

Then an additional process 33 regularly checks the log file 32 and responds according to the lack of entries or errors recorded in log file 32 where it can kill and restart any individual top-most processes 31. There is an additional process 34 that monitors process 33. Process 34 is a simple robust single function process that ensures that process 33 is alive and functioning and can restart process 33 as needed and process is monitored by the operating system 35.

Figure 4:
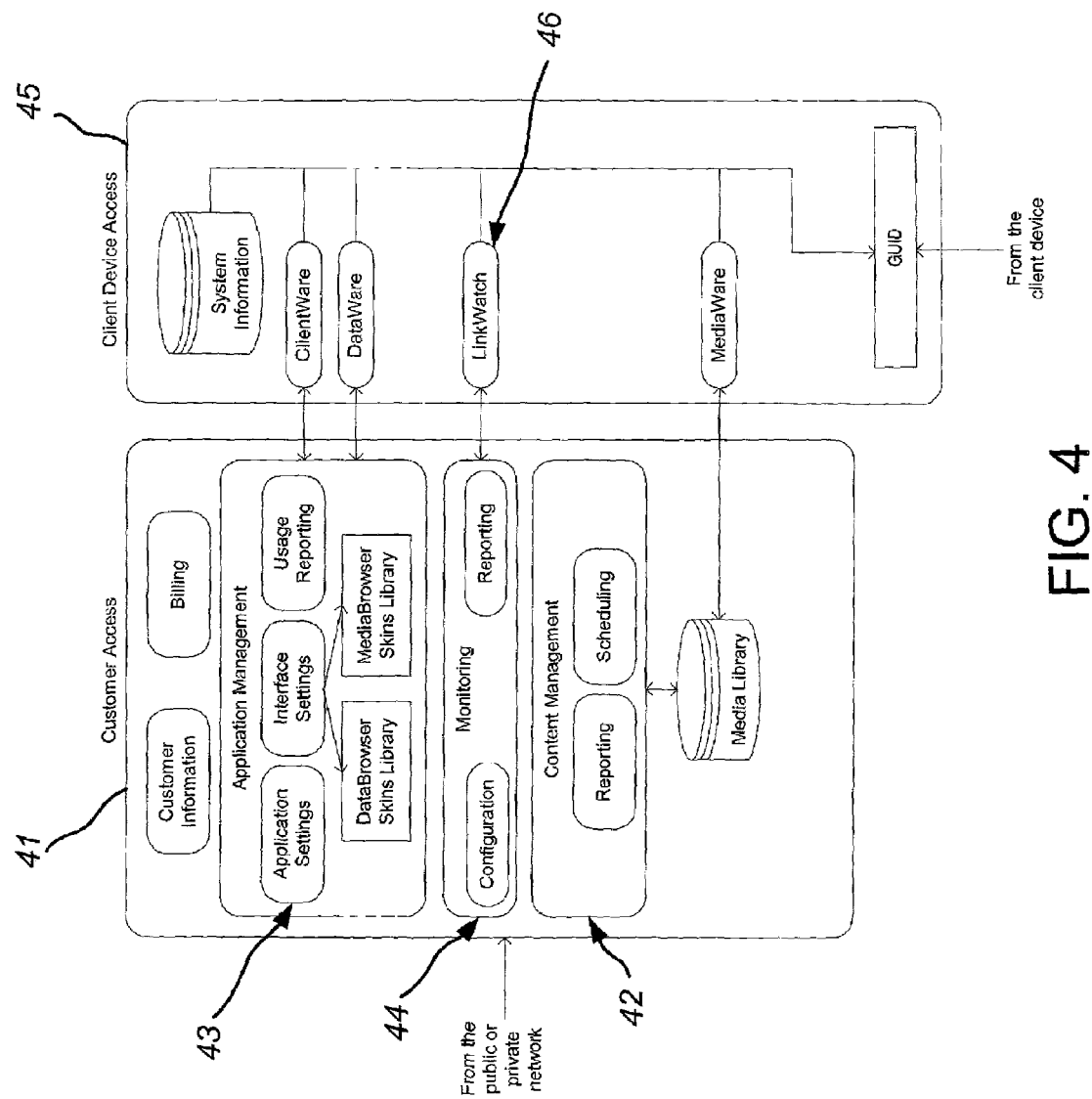
FIG. 4 is a block diagram of server components of the present invention.
Figure 5:
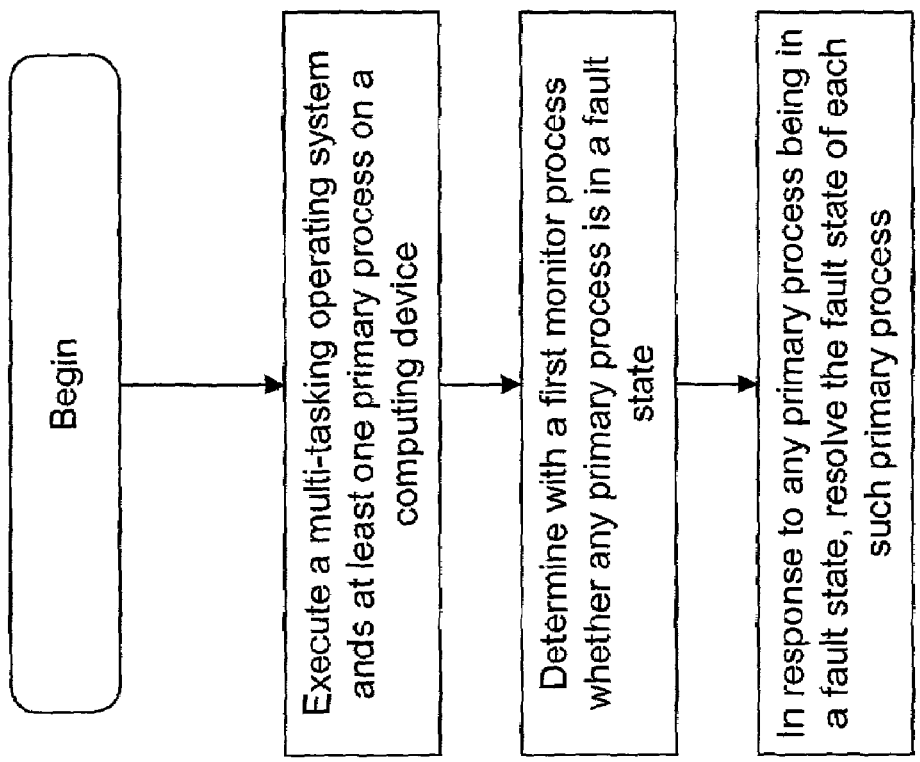
FIG. 5 is a flowchart of a method for providing a fault-tolerant remote controlled computing device.

The operating system 35 starts process 34 upon system start and detects process failures (absence) and restarts process 34 and then all processes are spawned by the lower level processes starting with operating system 35. The top-most processes can be infinite in number as defined by a configuration file and all processes are stopped by the lower level processes when process 34 is stopped intentionally by command. Process 33 is a fairly complex process that is somewhat susceptible to failure do to resource conflicts. The single function of process 34 makes it inherently more stable than process 33, adding another robust layer of process monitoring Server Components The server component (see FIG. 4) is a database-driven web application utilizing standard HTTP protocols and servers. It is an infinitely scalable application that can support an unlimited number of devices from one web interface. There is a centralized administrative web application that utilizes the latest encryption methods to create a highly secure point of administration.

LinkWare: This is the single web site 41 that allows customers to interact with the server to control, manage and review the activity of the individual devices and devices. The customer accesses this site from any location on the web or local network via an SSL capable web browser. In this application content is managed 42 as content is uploaded and distributed to the MediaBrowsers. The MediaBrowsers and applications are managed by 43 such as when DataBrowsers are remotely configured and all reporting of device usage is provided. The customer's information is stored here and user permissions are managed. Billing and invoicing is also integrated into the system so that customers have real-time access to their billing information. On this site is detailed information about the devices and the underlying networks. Also on this site are interfaces 44 for managing system availability, system configuration and system health information in real-time and historically.

ServerWare: This is the single web application 45 that contains multiple web applications that do the background work for all server components of the system. The segmentation by application allows the applications to be separated to multiple physical servers for increased load capacity if the needs arise. ServerWare is composed of:

ClientWare: This is the single web application that downloads device configuration files to the client for both all components via Administrator.

DataWare: This is the single web application that receives all logging information from the clients. This includes usage, error logging and system information.

MediaWare: This is the single web application that downloads content queues and binary data to MediaBrowser via MediaLoader.

LinkWatch: This is a module 46 that primarily resides in database business logic that detects monitoring related errors and dispatches notifications as needed. There is inherently information about system availability because of the client applications' interaction with the server. It is the absence of this information and the logic that analyzes this lack of information or existence of errors that makes up the monitoring features of the system.

In another embodiment of the present invention, autonomous multi-media computing devices are provided. An autonomous multi-media computing device may include a computing device which provides multi-media content to a user. In addition, the multi-media computing device may provide interactive features such that a user may search certain webpages, may browse to certain webpages, may select certain multi-media content to be displayed. Alternatively, the multi-media computing device may be configured such that it plays from a certain queue of multi-media content.

For example, the autonomous multi-media computing device may comprise a display screen within a retail store which provides advertisements, directions, instructions, and the like to the user. Generally, the autonomous multi-media computing device includes most of the common computing components found in a personal computer. Therefore, the autonomous multi-media computing device includes a network interface, a central processing unit (CPU), a storage device and a memory. The autonomous multi-media computing device is also typically connected to a display device such as a monitor. Alternatively, the autonomous multi-media computing device may be connected to multiple monitors or displays. In addition, autonomous multi-media computing devices may include peripheral devices such as a ATM card reader, a printer, a mouse, a keyboard, and the like.

In one aspect of the invention, the autonomous multi-media computing device is configured to allow interaction with a user and/or play certain multi-media content from a queue. How each of the autonomous multi-media computing device is configured may be controlled by a common configuration file.

In certain embodiments, a plurality of autonomous multi-media computing devices may be distributed throughout a particular retail store or mall. Alternatively, the autonomous multi-media computing devices may be located at various stores across the country and each multi-media computing device may be individually configurable to do specific tasks which relates specifically to the particular store location. Alternatively, each of the autonomous multi-media computing devices may be configured to do certain general operations in a like manner.

For example, a common logo for a particular retailer may be provided in each of the multi-media computing devices. Thus, in one embodiment, the autonomous multi-media computing device stores a local copy of the a common configuration file as well as multi-media content on a computing device. In this manner, the autonomous multi-media computing device has stored locally the multi-media content as well as configuration information to allow the autonomous multi-media computing device to operate independently of a server or other control mechanism.

Preferably the autonomous multi-media computing device stores a local copy of a common configuration file which determines how a plurality of multi-media computing devices will operate. A common configuration file may include several parameters and settings which determine how the autonomous multi-media computing device operates. For example, the common configuration file may include a listing of approved URL's within which a user of the multi-media computing device is allowed to navigate to.

In addition, the common configuration file may include timing information which indicates when the multi-media computing device is required to report logging information and/or query a central server for updates to software which is executing on the multi-media computing device, multi-media content which may be executing, and/or a new local copy of the common configuration file.

Preferably the autonomous multi-media computing devices are connected to a network or may be connected periodically to the network. For example, the multi-media computing devices may be wireless devices which use a wireless connection. Alternatively, the multi-media computing device may use a dial-up connection. In yet another embodiment, the multi-media computing devices have a continuous connection to a network.

In certain embodiments, the autonomous multi-media computing devices may poll a server at pre-determined time intervals via a public Internet connection for updates to one or more processes which are executing on the multi-media computing devices. The processes as described earlier, include certain players, browsers and the like which are responsible for providing the multi-media content and well as interactive features for a multi-media computing device. In addition the processes may include monitoring processes which are tasked with insuring that the other processes continue to execute.

In other embodiments the updates may include updates for the a multi tasking operating system which executes on the multi-media computing device. Thus, updates include updates to multi-media content, the local copy of the common configuration file, the updates to the processes which execute and provide the multi-media content, and/or updates to an operating system executing on the computing device.

In certain embodiments, the server comprises one or more computers which are tasked with receiving queries from the multi-media computing devices and responding to the queries by providing updates. The updates include updates to the software, the operating system, the multimedia content and/or the local copy configuration file. The predetermined time intervals in which each multi-media computing device determines when to poll the server are preferably set within the local copy of the configuration file. In certain embodiments, each autonomous multi-media computing device may be provided with a different time interval or a different time at which time the multi-media computing device is responsible for polling server.

Generally, a public Internet connection is unreliable, unstable, and some cases of very low bandwidth. For example, the Internet connection may be a dial-up connection. Alternatively, the Internet connection may be a wireless connection with a limited bandwidth.

In addition, depending on where the multi-media computing devices are located the Internet connection may not be reliable. For example, the multi-media computing devices may be located throughout retail stores or parts of the country where public Internet services are not as available.

Therefore the service may be interrupted even during a connection. For example, the phone lines may be disconnected or other interruptions may occur. In addition, the public Internet connection is also generally very insecure. Messages sent via the public Internet connection may be captured by others. Due to the generally limited bandwidth available via a public Internet connection, downloading of multi-media content such as large video files may be interrupted during the download.

In certain embodiments, polling may include connecting to the server from within a firewall. In certain embodiments, polling also includes reporting of display statistics available or associated with the multi-media content. Conventionally, the multi-media computing devices may be configured to display multi-media content at certain times. However, if the multi-media computing device is unavailable, or has entered a fault state for some reason, the multi-media content may not have been displayed as scheduled. However, in the present invention, the polling may include recording at the autonomous multi-media computing device which multi-media content was actually displayed to users of the device. The display statistics may then be reported back to the server.

Thus, in one embodiment, in response to updates being available from the server, one or more of the updates may be downloaded via a fault tolerant network connection. As was discussed earlier, public Internet connection may be unreliable, may be interrupted, and this can severely disrupt downloading of updates. Typically, downloads of updates once an interruption occurs, simply begin downloading the entire update again. However, with a fault tolerant network connection, the multi-media computing device is able to download the update from the same point at which the interruption occurred.

So, a certain portion of the update may be downloaded prior to a disconnection. Subsequent to the disconnection, the remainder of the update may be downloaded. Therefore, generally a fault tolerant network connection includes a network connection which allows downloading of a file to resume once a broken network connection is reestablished.

In certain embodiments, the downloading of updates may be done in a streaming format. Meaning, the update is downloaded to the storage device of the multi-media computing device while the multi-media computing device continues to display other multi-media content. Multi-media content being downloaded may not be available for display or presentation on the multi-media computing device until the entire multi-media content is downloaded. In this manner, the very large multi-media content files may be downloaded even over unreliable or slow network connections. Of course the multi-media content may also include interactive content which allows a user to interact with the computing device.

The updates including the local copy of the common configuration file may be transmitted via various protocols. An example of which is the extensible markup language format (XML). This allows the multi-media computing device to receive and exchange information with the server even if the multi-media computing device is behind a firewall or a private network.

Conventionally, multi-media computing devices behind a firewall or on a private network are not able to use a public Internet connection because of security risks. However, in certain embodiments of the present invention the multi-media computing device contacts the server. Because the connection is from the multi-media computing device to the server, the communication is allowed to take place through the firewall or private network even over a public Internet connection.

Operational and Interaction Details

Configuration Management

The system configuration is maintained by a process that periodically, queries the Server for any updates for the Client. The server responds with a list of required updates, which may include software updates, configuration file updates, scripts to be processed, "skin" files, etc. The administrative process then loops through the list of updates, and retrieves each update from the server based on the details specified for each update.

One of the core files maintained by the administrative process is the configuration file, which becomes the central means of configuring processes and the system as a whole on the Client. The configuration file is a central file that stores parameters that are either global in scope, or specific to a certain process. All processes query the file for their core base of functionality. The file is encrypted, so that only the system processes can open, or write to the file. The file is structured in a hierarchical format such that each process can query and parse its own section, without considering the structure of another process' section. Each process can also query and parse the global section of the file for certain functionality. Each process's section can also contain an infinite subset of sections that the process derives functionality from. The configuration file is derived from many different tables on the server that specify functionality. An example embodiment of a configuration might look like this (all table names, structures, and file tags do not reflect the current syntax of the implemented solution but have been generalized):

| ProcessSettings | | ScreenProcessSettings | | GlobalSetting | |
|---|---|---|---|---|---|
| PK | Process | PK | Screen | PK | Name |
| PK | Name | PK | ProcessSetting | | |
| | Default | | Value | | Default |
| ScreenGlobalSetting | | ProcessLogs | | WindowURLs | |
| PK | Screen | PK | Process | PK | Screen |
| PK | GlobalSetting | PK | Log | PK | Window |

-continued

| Value | Value | URL |
|---|---|---|

```
<Global Settings>
    <Sleep Start> 12:00 AM</Sleep Start>
    <Sleep Stop> 12:00 AM</Sleep Stop>
</Global Settings>
<Process Settings>
    <Process>
        <Name>Process 1</Name>
        <RefreshTime>15</RefreshTime>
        <URLs>
            <Window1>http://www.cnn.com</Window1>
            <Window2>http://www.espn.com</Window2>
        </URLs>
        <Logs>
            <Log>
                <Name>Log1</Name>
                <Timer>15</Timer>
                <FileName>Log1.txt</FileName>
                <PostURL>http://. . . com/log1</PostURL>
            </Log>
        </Logs>
    </Process>
    <Process>
        <Name>Process 2</Name>
        <RefreshTime>25</RefreshTime>
        <UpdateConfigurationTime>25</UpdateConfigurationTime>
        <Logs>
            <Log>
                <Name>Log2</Name>
                <Timer>10</Timer>
                <FileName>Log2.txt</FileName>
                <PostURL>http://. . . com/log2</PostURL>
            </Log>
            <Log>
                <Name>Log3</Name>
                <Timer>25</Timer>
                <FileName>Log3.txt</FileName>
                <PostURL>http://. . . com/log3</PostURL>
            </Log>
        </Logs>
    </Process>
</Process Settings>
```

The purpose of this element of the invention is to centralize control of client application configurations across the web in a secure manner using standard protocols while allowing the web device to be hidden inside a private network. As shown a single file is used to dictate all configuration settings for a plurality of software executables that work in conjunction to support one application. A configuration file is structured as a parent-child hierarchy embodied in XML or similar markup language. Configuration for each device is stored in a database at a central location on the web. Addition and subtraction of configuration parameters is done at the server and is unlimited. Configuration controls not only parameters for startup but for regular polling by executables allow the configuration file to seed events throughout the system throughout the operational period. All client configuration parameters are set on the server and can be set for a single device or multiple devices. A client application regularly polls a central server via an encrypted request to retrieve configuration information contained in the single configuration file.

The key benefit of this embodiment is a single point of maintenance without physically visiting the client hardware. Additional features include; 1) the ability to apply changes to a single device or groups of devices with one operation; 2) the configuration granularity is down the single parameter and the configuration file is not constrained in that additional parameters can be added without effecting stability because the system is fully backward compatible and 3) a history file of the configuration is stored at server (for a finite period of time) allowing rollbacks to earlier configurations Note that the configuration delivered to the client is a snapshot or instance of the actual configuration file, which is beneficial because the data integrity is preserved even in the event of destruction of client application and the client application can work independently of the web service, with the last loaded version of the configuration continuing to function in the event of loss of the web service due to network or server failure.

The client application initiates the download of the latest configuration file which is advantageous for the following reasons; 1) the client application can be on a private network, behind a firewall, and still retrieve configuration information securely using encryption over public connections on the Internet; the configuration file itself can determine when the next configuration retrieval will take place and finally the mechanism is based on industry standard protocols using third-party servers as the interface to the application Using a single configuration file (rather than multiple files per machine) for all local applications reduces overall load on the server by minimizing requests and minimizing storage.

Client Authentication

Client authentication is currently handled via a unique identifier on the client computer (GUID). The servers have a registered list of GUIDs and any requests by machines with a GUID other than in the database are ignored. This GUID is a 32-bit unique string that functions as an authentication token between client and server. This will prevent any spoofing that could be accomplished because the random GUID is unique to the system, the number of possible GUIDS is in the billions and the client's GUID is never disclosed in a clear text manner.

All communication is initiated by the Client, which passes along the GUID when attempting to pass or retrieve any data. The GUIDs are generated by the Server, which associates that GUID with a Client and keeps track of when the GUID was generated, and when it was first used by the Client. Once a certain period of time has passed from when the Client first used a GUID, the Server generates a new GUID and sends that GUID to the Client. Once the Client responds using the new GUID as its authentication key, the old GUID is considered invalid, and no communication between Client and Server is permitted using the old GUID. If the Client fails to respond with the new GUID in a certain period of time, the GUID update is considered failed and the Server generates another GUID, and again waits for the Client to respond with that GUID. Once a Client properly responds with a new GUID, that GUID becomes the identity of that Client, and the server begins again to monitor the length of time that the GUID is used. This mechanism provides maximum authentication integrity and consistency.

Centralized (Uniform Resource Locator) URL Filtering

A centralized URL access control mechanism is provided that allows remote, automated changes, maintaining a master list for data integrity and the ability to apply to a single or an infinite devices with one operation, allowing large-scale access control. Each device keeps a local URL filtering list utilized by the browser to prevent access to un-acceptable sites. The list is stored at the central server and downloaded to the client upon changes at the server. This allows access lists to be applied to individual devices or across groups with one command from the server without requiring a physical visit to the client device.

The system is comprised of a centralized storage of a master URL access list on the server allowing centralized configuration of the allowed URLs, providing the ability to apply changes to a single client or groups of clients with one operation. The configuration granularity is down to a single URL for a single client. A history of the configuration is stored (for a finite period of time) allowing rollbacks to earlier access lists. Access list delivered to the client is a snapshot or instance of the master access list, which is beneficial because data integrity is preserved at server in the event of destruction of client and the client can work independently of server, with the last retrieved version of access list continuing to function in the event of loss of network or server. The Client initiates the download of the latest URL access list which is advantageous because the client can be on a private network, behind a firewall, and still retrieve the information securely using encryption over the network. Communication is based on industry standard protocols using third-party web server software as the interface to server and the client restricts browser access (out going) to only the URLs in the local access list. Also, a wildcard character can be used to open access by pattern (i.e., *.*.com allows traffic to all .com URLs)

Content Player Mechanism

This section contains a description of a system for scheduling, downloading and displaying arbitrary media on a remote client based on a configuration file stored at a well-known location. It contains a generalized description of the system, as well as a specific example of one possible implementation of the system and a configuration file that might be used by that implementation.

The following definitions will be used in this section:
Server: A centralized computer system which stores MediaFiles and Queues.
Client: A single web-enabled computer system, which may optionally contain a display. A Client can have a Calendar assigned to it, which implies that the Client should be capable of playing any content in that Calendar.
MediaFile: A single piece of content that can be played by the Client.
Program: A schedulable collection of MediaFiles.
Calendar: A collection of Programs. A Client can have only one Calendar assigned to it at any time.
Queue: A configuration file that contains information on all Calendars, Programs and MediaFiles that are currently assigned to a Client.
Player: An application that runs on the Client and "plays" MediaFiles. The word "play" in this context simply means to "use". The exact definition will vary among implementations.
Loader: An application that runs on the Client and downloads MediaFiles and the Queue from the Server.

Loader

When the Client starts up, Loader begins running automatically. It contacts the Server, sending a unique identifier to allow the Server to authenticate it and look up its Queue. The Server looks up the Client by the unique ID, finds the Calendar assigned to the Client, and generates the Queue file for the given Calendar. Loader then downloads the Queue and saves it to the Client's local hard drive.

Once the Queue has been downloaded, Loader parses the Queue file looking for MediaFiles to download. For each MediaFile listed in the file, Loader checks the local hard drive to see if it has been downloaded. If the MediaFile has been downloaded completely, Loader goes on to the next in the list. If it does not exist, Loader contacts the Server and tells it which file it needs. The Server then returns the binary data for the MediaFile, which Loader saves to the local hard drive. If the file exists but the file size does not match the size given in the Queue file, Loader contacts the Server and tells it what file it needs and where in the file to begin downloading. The Server then returns the binary data for the MediaFile, starting from the byte position specified. In this way, Loader can resume downloading after an interrupted download. Loader downloads a MediaFile in small chunks and writes each chunk to disk after downloading, rather than downloading the file to memory. This serves the dual purposes of conserving memory and enabling the resumption of failed downloads.

After downloading all necessary MediaFiles, Loader continues to run indefinitely, periodically downloading the Queue and downloading any new MediaFiles found in it.

Player

When the Client starts up, Player begins running automatically. It waits until it finds that the Queue file, downloaded by Loader, has been saved to the local hard drive. Player parses the Queue file to find the highest-priority Program which is scheduled to play at the current time and date. It then finds the first MediaFile that is a member of this Program. If this MediaFile exists on the hard drive, Player plays it. Otherwise, it moves to the next MediaFile in the Program. If none of the MediaFiles in the Program have been downloaded, it moves on to the next-highest-priority Program that is scheduled to play at the current date and time. It continues this algorithm until all MediaFiles in all currently-scheduled Programs have been checked.

Assuming Player has found a MediaFile to play, it continues to play the file until one of three events occurs:
1. The MediaFile ends.
2. The schedule for the current Program is no longer current.
3. The Queue changes and a new Program becomes the highest-priority scheduled program.

In any of these cases, the above algorithm for choosing the next MediaFile is repeated and the resulting MediaFile is played.

Program Scheduling

To decide whether or not a particular program should be played at a particular time, Player utilized several attributes of a Program. These are BeginDate, EndDate, BeginTime, EndTime, Priority, and Recurrence. BeginDate and EndDate specify the range of dates during which a Program should play. BeginTime and EndTime specify a range of times during each day that a Program should play. Priority specifies an ordering for Programs in case of overlapping schedules. Recurrence specifies how often a Program should play as a function of the following criteria: Day of Week, Year, Month of Year, Day of Month, Hour of Day, Minute of Hour, and Second of Minute. For example, a program could be scheduled to recur on Thursdays and Fridays in March of 2002 at 3:30 and 5:30 PM. In the Queue example shown below, Recurrence is represented as a Regular Expression, but other representations are possible.

Queue

The following is an example Queue file. This example is in XML format, but this is not required. Any format can be used as long as Loader and Player are adapted to understand the format. The design of the system very naturally allows for the use of "special" MediaFiles, such as a "default" file that play if the user hasn't scheduled anything else (i.e. a MediaFile with the lowest possible priority with a schedule of all possible times and dates) or a "blackout" file that is simply a black image which is displayed at a venue during off-hours to increase the life of a plasma device (i.e. a MediaFile with the highest possible priority which is scheduled to run during the night). Examples of these files can be seen below.

```
<Calendar>
  <Program
    BeginDate="2001/01/01"
    EndDate="2002/01/01"
    BeginTime="22:00:00"
    EndTime="08:00:00"
    Recurrence="([1-7]) [0-9]{4}/[0-1][0-9]/[0-3][0-9] [0-2][0-9]:
      [0-5][0-9]:[0-5][0-9]"
    Priority="1"
  >
    <MediaFile
      MediaFileID="350"
      Name="Blackout.bmp"
      Time="3600"
      Position="1"
      Size="66"
    />
  </Program>
  <Program
    BeginDate="2001/10/02"
    EndData="2001/11/02"
    BeginTime="00:00:00"
    EndTime="23:59:59"
    Recurrence="[1,3,5] [0-9]{4}/[0-1][0-9]/[0-3][0-9] [1][1,3,5,7,
      9]:30:[0-5][0-9]"
    Priority="2"
  >
    <MediaFile
      MediaFileID="333"
      Name="Basketball.mov"
      Time="192"
      Position="1"
      Siza="6754906"
    />
    <MediaFile
      MediaFileID="102"
      Name="Gone.mov"
      Time="145"
      Position="2"
      Size="44219570"
    />
  </Program>
  <Program
    BeginData="2001/01/01"
    EndData="2010/01/01"
    BeginTima="00:00:00"
    EndTime="23:59:59"
    Recurrence="[1-7][0-9]{4}/[0-1][0-9]/[0-3][0-9] [0-2][0-9]:
      [0-5][0-9]:[0-5][0-9]"
    Priority="10"
  >
    <MediaFile
      MediaFileID="349"
      Name="Default.swf"
      Time="30"
      Position="1"
      Size="5419"
    />
  </Program>
</Queue>
```

Bandwidth Agnostic, Failsafe Distribution System

The purpose of this embodiment is to provide a centrally managed rich media distribution system that allows large binary media files to be seamlessly distributed across the Internet into private networks, across minimal bandwidth connections, while maintaining stable playing at the device and logging of actual media file plays. A client application retrieves in the background the current play queue from the central server. Last available queue is played if the network is inaccessible. Queue manipulation can take place for a single device or unlimited multiple devices with a single command. Logging of actual plays that are uploaded to a central server to reconciliation with expected plays for reporting to maintain data integrity. The client application retrieves in the background binary data from a central server and does not invoke a local play until the data is fully retrieved. Allows large binary data to be played on a device without requiring high-bandwidth connections. Creates a localized caching system that has auto expiring files and cache flushes can be invoked from the server as binary files are deleted from the central server. Has no limit to the size or quantity of binary data, being only limited by local systems hard-drive space.

The system is comprised of a Centralized storage of the queue allowing remote management of individual queues, provides the ability to apply changes to a single client or groups of clients with one operation and the a history of the queue is stored (for a finite period of time) allowing rollbacks to earlier queues. The queue delivered to the client is a snapshot or instance of the queue on the server, which is beneficial because at data integrity is preserved at server in the event of destruction of client and client can work independently of the server, with the last retrieved version of the queue continuing to function in the event of loss of network or server. The client initiation of the download of the latest queue which is advantageous because the client can be on a private network, behind a firewall, and still retrieve the information securely using encryption over the Internet. The client logs only actual plays to a local log file and uploads to the server to allow data integrity at the server by reporting actual plays versus expected plays The system is comprised of a client that retrieves the binary file from the server on the Internet and the name of the binary file to retrieve from server is provided by the queue file which has previously been retrieved and is stored locally as an instance. The binary file is stored in a central database and works across privatized networks behind firewalls because client initiates the download. The binary file streams in the background to minimize client CPU load to allow other binary files to play while receiving the binary file and maximize available RAM on client and allows minimal bandwidth lines to be successfully used. The client stores the binary file on the local hard drive as an instance creating a caching mechanism. The available space on local hard drive is the only limiting factor and the client self-regulates the cache by automatically deleting the binary file when the binary file is deleted from server.

Client Look-and-Feel Changed via a "Skin" Technology

This section contains a description of a system for enabling end-user customization of the user interface and functionality of an application based on a centralized configuration file. It contains a generalized description of the system, as well as a specific example of one possible implementation of the system and a configuration file that might be used by that implementation.

Many recent visual applications support a concept known as "skinning," in which the user can apply a number of different modules to change the look and feel of the application. However, these methods generally only allow the user to modify the visual appearance of the application; they don't affect the application's functionality. This section describes a different approach to skinning, by which the user can configure the functionality of the application as well as the appearance.

In this section, the look-and-feel module will be referred to as the Skin, the end-user of the software who is building the Skin will be referred to as the User, and the software application that utilizes the Skin will be referred to as the Application.

The Skin concept described here has two main features that make it a powerful and extensible tool for the User. First, the Skin allows the User to invoke functionality in the Application from the skin itself. In this way, the Skin becomes a declarative programming language by which the User can change and enhance the operation of the original Application. Second, the visible elements of the Skin can be in any format that is understood by the Application, and can be as complex as necessary. This complexity is completely hidden from the Application itself.

For example, if the Application happens to contain one or more embedded web browsers, the presentation language might be HTML. This HTML can be as sophisticated as any web page, and can include images, embedded media, and client-side scripts. However, the container Application needs to know nothing about the complexities of the presentation web page contained in the skin. The embedded web browser handles all the parsing and rendering of the page, as well as the executing of any client-side script code and the display of any media files. The only elements of the presentation page that the Application needs to consider are those that have been hooked to its functionality by the User using the directives in the Skin.

The Skin is contained in a configuration file. This configuration file can be in any format, provided the Application is written to understand it. The example in this section uses XML as the configuration file format. The configuration file contains all the information the Application needs to set up its visual appearance, and also contains information the Application uses to map visible display elements to Application functionality. For example, the file may describe the position and appearance of a set of buttons, and then map mouse clicks on those buttons to specific Application functionality. In this way, the skin becomes an active part of the Application and the User gains the power to modify not only the appearance of the Application, but its behavior as well.

The following is an example Skin for an Application which contains three embedded web browsers:

```
<Skin>
  <window Idx="0">
    <HTML>
      <Div ID="Home"
        Src="Home.bmp"
        Style="background-imege:url(Home.bmp)"
        OnMouseOver="changeImg( )">
      </Div>
      <Script Languaga="JavaScript">
        function Changeling( )
        {
          Home.style.backgroundlinaga = "Home2.bmp"
        }
      </Script>
    </HTML>
    <Binaries>
      <Binary Name="Home.bmp">
        @#%@jfwoija;lkjasefpoiaoij3$@#fpoijf$#@$13
```

-continued

```
      </Binary>
      <Binary Name="Home2.bmp">
          @#%@jfwoija;lk1$!#@!#% !#wdfowi#fpoijf$#@$13
      </Binary>
  </Binaries>
  <Events>
      <Event Hame="DocumentComplete" Source="Browser">
          <Func Hame="bfnPositionBrowser">
              <Param Name="TargatIdx">0</Param>
              <Param Name="Left">0</Param>
              <Param Nama="Top">0</Param>
              <Param Name="Width">1024</Param>
              <Param Name="Height">768</Param>
              <Param Name="ZOrder">0</Param>
          </Func>
      </Event>
      <Event Name="onclick"Source="MTML">
          <Element Name="Home">
              <Func Name="bfnHone">
                  <Param Name="TargetIdx">1</Param>
              </Func>
          </Element>
      </Event>
  /Events>
</Window>
<Window Idx="1">
  <Events>
      <Event Name="BeforeNavigate2" Source="Browser">
          <Func Name="bfnRedirectNavigation">
              <Param Neme="TargetIdx">2</Param>
          </Func>
      </Event>
  </Events>
</Window>
<Window Idx="2">
</Window>
</Skin>
```

In this example implementation, the Skin file contains three Windows, which correspond to the three embedded browsers. The first Window has its appearance defined by its HTML section, which in this case contains an element and client-side scripting code to change the background image of the element when the mouse is passed over it. This demonstrates that the Skin can contain arbitrarily-complex scripting code, giving unlimited control over the Application's outward appearance without requiring any changes to the Application.

The above Skin also contains Events, which allow the User to map Skin elements to Application functionality. The first Event section specifies Application functions to be invoked when the HTML page of this Window finishes loading ("DocumentComplete"). It is important to note that the names of the Events are arbitrary. They are simply keywords that the Application itself has defined to represent certain states within the Application. The Skin then defines which actions should be taken when the Application enters into that state. In this case, the Window is positioned and sized on the device.

The first Window contains another Event, called "onclick". This represents an action to take when the element named "Home" in the HTML for the Window is clicked. In this case, a function called bfnHome is called with a value of "1" for the "TargetIdx" parameter, which in the semantics of this Application means "Navigate the second web browser to its home page." Finally, the second Window contains an Event which causes any navigation on its underlying web browser to be redirected to the third browser and loaded into it instead.

These are implementation details that simply illustrate the concept but do not define it. An Application could name its functions in any way it chose and, indeed, could use an entirely different format for invoking them. The functions listed in the also Skin need not correspond directly to actual functions defined in the Application code; they might only be keywords that the application uses to lookup the functionality desired. The general concept is that the Skin itself has the power to invoke functionality in the Application.

Public Monitoring System for Private Web Devices

Summary

Monitoring of computing devices inside private networks is possible from a monitoring server on the Internet or private network with intelligent and flexible escalations, alerts and points of notification as well as informative reporting of status and history. The system regularly receives request information from remote web devices inside private networks and the absence of information at the server can be used to trigger alerts, providing information about end-to-end network integrity. Highly flexible points of notification, alert types and frequency and escalation levels are used to control when, who and how individuals are notified of the failure of a web device.

The client application behind a firewall on a private network queries server on a regular basis as set by a configuration file and uploads client system status information, statistics and a timestamp client can be on a private network and still retrieve the information securely using encryption over the Internet. The communication is based on industry standard protocols using third-party web server software as the interface to server and periodic device grabs of client are reduced to thumbnails (small images) to maintain privacy and uploaded to server.

There is an application on the server which determines the client failure by detecting lack of timestamps from the client over a determined percentage threshold and detection contains business logic that accounts for multiple points of failure which then dispatches alerts through server which can alert through multiple communication types such as email or pager. A flexible, yet persistent escalation method is present that as time from initial failure increases. Escalation levels are invoked and levels of escalation are unlimited and time between escalations is arbitrary. It is an alert system that alerts to unlimited multiple points of notification where points of contact information are infinitely configurable via total alerts. Frequency between alerts is also configurable for the point of notification. Information for client is viewed from the server such as device grabs by the client in displays of 24-hour views (1 per hour) and on-demand. Additionally system level information is extracted and delivered is a similar manner. This information is viewable from the server as well. System utilization, event notices and current configurations can all be collected and delivered to the server.

In another embodiment, a user-defined notification system is provided for tracking status parameters associated with the plurality of computing devices including autonomous multi-media computing devices.

The user-defined notification system may include user-defined events which are stored. A user-defined event includes one or more status parameters which are common among the plurality of computing devices. A status parameter is one or more parameters heuristics relating to the computing device. For example, status parameters may include how much disk space used, how often the computing device is contacted by the server, the current version is of the updates, how much CPU utilization has been made by processes running on the computing device, and the like.

Those of skill in the art will recognize that various additional status parameters may be included.

In addition, the user-defined notification system may store an address to receive a notification when one or more of the status parameters satisfies threshold values. The address may be a telephone number, an email address, a pager number or various other addresses which are used to contact people to respond to the notification. The notification may be simply a message which indicates that the one or more parameters has satisfied threshold values.

The threshold values may also be defined by the user. Threshold values may include a certain number of re-boots of the multi-media computing device or a certain amount of disk space in use. Those of skill in the art recognize that the threshold values may be ranges or individual values.

In addition, the user-defined notification system receives reports of the status parameters from the plurality of computing devices at predetermined time intervals. Once the reports of the status parameters are received, the notification system determines whether the reported status parameters satisfy one or more user-defined events and in response to user-defined events being satisfied, a notification is sent to the stored address. Of course, those of skill in the art recognize that multiple notifications may be sent to multiple addresses to notify multiple personnel to attend to a certain user-defined event.

In certain embodiments a user-defined event may be associated with a frequency parameter to define an escalation level. A frequency parameter may include a number of occurrences or specific time interval within which certain user-defined events may occur. If a user-defined event occurs at that frequency or within those number of occurrences, this defines an escalation level. Escalation levels are useful to define when particular personnel are to be notified of a user-defined event. In addition one or more escalation addresses may be associated with the escalation level.

For example, an escalation level may be define that if the computing device reboots five times within one hour, then a second level technician as well as the primary technician may be contacted so that both can respond to the situation and repair the computing device.

The user-defined notification system in certain embodiments may also include tabulating the frequency parameters when the user-defined event associated with the escalation level is satisfied. In response to the escalation level being satisfied, a notification may be sent to the one or more addresses.

Sending of the notification may include sending a notification or a message via specific messaging protocol. The message may be an email message. The messaging protocol may be determined by the stored address. For example, if the address is an email address, then the notification message will be an email message. If the address is a phone number, then the message may be a voice mail delivered to that phone number.

Therefore, the present invention provides several advantages over the conventional systems. The present invention provides significant reliability and minimizes maintenance required for remote control computing devices. The remote control computing devices may be maintained and/or repaired with new software without user intervention. The computing devices may be configured to function autonomously, meaning they do not require continuous network connection or even a reliable connection to the server. And finally, a user-defined notification system may be provided which allows a user to define which parameters are important regarding each computing device and when notification of satisfaction of certain parameter thresholds should be sent.

Detailed Description

This section contains a description of a system for monitoring the operation of remote computers. In this system, the remote computers periodically contact a central server computer to report various status parameters. The system allows users to subscribe to be notified when these parameters take on certain values, which the users can configure themselves.

The following definitions will be used in this section:

Server: A centralized computer system which runs the Dispatcher and contains the Database.

Client: A remote computer system that periodically reports its status information to the Server.

Status Parameter: A single name/value pair from a Client, which is a temporal snapshot generally some system parameter such as CPU utilization or hard drive space. Every Status Parameter has a name and a value associated with it.

Event: A collection of Status Parameter values, defined by a User, that represents a "point of interest" whose occurrence (i.e. the simultaneous occurrence of all status parameter values in the Event) triggers the dispatch of Notifications to assigned Points of Notification.

Notification: A message (email, voice, WAP, or any other protocol) that is sent to one or more Points of Notification upon the occurrence of an Event.

Point of Notification (PON): A valid address, using one of the messaging protocols supported by the Dispatcher, which is able to serve as a recipient of Notifications.

Database: A centralized repository for Client status information, Events, and PONs.

Dispatcher: A process which runs on the Server and uses the Client status information to determine if any Events have occurred. When an Event is detected on a Client, the Dispatcher sends Notifications to any PONs subscribed to that Event on that Client. All messaging-protocol-specific support is written into the Dispatcher.

User: An end-user who administers the monitoring system by defining Events and subscribing PONs to those Events.

Client Status Parameter Uploading

Any number of Clients can be set up for monitoring. Each Client periodically establishes a connection to the Server and, through a predefined interface (such as XML over HTTP), uploads a collection of Status Parameters and their current values. The Server stores the Status Parameters in the Database.

Point of Notification Creation

The User connects to the Server using some sort of client software, such as a web browser if the Server interface happens to be a web site. The User creates a PON by providing an address which represents a valid endpoint under one of the messaging protocols supported by the Dispatcher. The User can also specify the maximum number of times the PON should be notified about an Event as well as the frequency at which the notifications should be sent.

Event Creation

From the Server interface, the User chooses a group of Status Parameters and a desired value or ranges of values for each. The User then gives this collection a name to define an Event. The simultaneous occurrence of the given values in the given Status Parameters then represents the occurrence of the Event. The Event is stored in the Database.

Subscription Creation

Once one or more Events have been defined, the User uses the Server interface to create a three-way association between Clients, PONs, and Events. The semantics of this association are that when Event A occurs on Client B, Point of Notification C should be notified. This is known as "subscribing" the PON to the Events. These subscriptions are stored in the Database.

Notification Dispatch

The Dispatcher periodically scans the Status Parameters in the Database looking for collections of values that represent the occurrence of an Event on a given Client. When an Event is detected, the Dispatcher looks up all PONs who are subscribed to that Event on that Client, and dispatches a message to each PON using whatever protocol the PON has been configured to use. The Dispatcher will continue to notify a PON about an Event until the conditions defining the Event are no longer true, or the maximum number of notifications for that PON has been reached. The frequency at which the Dispatcher sends these notifications is determined by the notification frequency setting for the PON.

Based on the foregoing, the present invention offers a number of advantages not available in conventional approaches. The present invention provides fault-tolerant remote controlled computing devices which provide high reliability, may function with limited access to a remote server even over a public Internet connection. In certain embodiments, users may define notifications concerning what parameters should trigger a notification to be sent to a person to remedy remote computing devices experiencing technical difficulties.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for providing an autonomous multimedia computing device, the method comprising:

storing a local copy of a configuration file and multimedia content on the autonomous multimedia computing device, wherein the configuration file comprises parameters and settings which determine how the autonomous multimedia computing device operates;

polling a server at pre-determined time intervals via a public Internet connection for updates to one or more processes, the local copy of the configuration file, and the multimedia content;

in response to updates being available from the server, downloading one or more updates from the server, wherein the downloading occurs without user input; and playing the multimedia content based on instructions contained within the local copy of the configuration file, wherein the configuration file defines a program that comprises one or more media files and priority and timing information for the one or more media files, and wherein playing the multimedia content comprises playing the one or more media files according to the priority and timing information.

2. The method of claim 1, wherein storing comprises saving the local copy of the configuration file and the multimedia content to a storage device integrated with the computing device.

3. The method of claim 1, wherein polling comprises:
connecting to a server from within a firewall.

4. The method of claim 1, wherein polling comprises:
connecting to a server via a fault-prone network connection.

5. The method of claim 1, wherein polling further comprises:
reporting display statistics associated with the multimedia content.

6. The method of claim 1, wherein downloading comprises:
streaming at least one update to the computing device prior to allowing access to the updates.

7. The method of claim 1, wherein the local copy of the configuration file is in eXtensible Markup Language (XML) format.

8. The method of claim 1, wherein the updates are downloaded via a fault-tolerant network connection which allows downloading of a file to resume once a broken network connection is re-established.

9. The method of claim 1, wherein the multimedia content comprises interactive content allowing a user to interact with the computing device.

10. The method of claim 1, wherein the multimedia computing device is a multimedia display device, and wherein the multimedia content does not allow input from a user of the multimedia display device.

* * * * *